United States Patent
Chidichimo et al.

(10) Patent No.: US 6,383,577 B1
(45) Date of Patent: May 7, 2002

(54) REVERSE MODE ELECTRO-OPTICAL FILM COMPOSED OF ONE MUTUAL DISPERSION OF POLYMERS AND LIQUID CRYSTALS

(75) Inventors: Guiseppe Chidichimo; Giovanni De Filpo, both of Rende (IT)

(73) Assignee: Consorzio per le Tecnologie Biomediche Avanzate - Tebaid, Rende (IT)

( * ) Notice: Subject to any disclaimer, the term of this patent is extended or adjusted under 35 U.S.C. 154(b) by 0 days.

(21) Appl. No.: 09/446,230

(22) PCT Filed: Jun. 25, 1998

(86) PCT No.: PCT/IT98/00175

§ 371 Date: Dec. 17, 1999

§ 102(e) Date: Dec. 17, 1999

(87) PCT Pub. No.: WO99/00464

PCT Pub. Date: Jan. 4, 1999

(30) Foreign Application Priority Data

Jun. 27, 1997 (IT) .......................... CZ97A0004

(51) Int. Cl.$^7$ .................. C09K 19/38; C09K 19/52; G02F 1/1333

(52) U.S. Cl. .............. 428/1.1; 252/299.01; 252/299.67; 252/299.5; 428/1.5

(58) Field of Search .................. 252/299.01, 299.5, 252/299.64, 299.65, 299.66, 299.67; 428/1.1, 1.5

(56) References Cited

U.S. PATENT DOCUMENTS

| 4,435,047 A | 3/1984 | Fergason |
| 4,688,900 A | 8/1987 | Doane |
| 5,189,540 A | 2/1993 | Nakamura |
| 5,401,437 A | * 3/1995 | Im ......................... 252/299.01 |
| 5,585,035 A | * 12/1996 | Nerad et al. ........... 252/299.01 |
| 5,674,576 A | 10/1997 | Gotoh |

FOREIGN PATENT DOCUMENTS

| EP | 451905 | * 10/1991 |
| EP | 448116 | * 6/1992 |
| EP | 703287 | * 9/1995 |
| EP | 799879 | * 10/1997 |
| GB | 2297556 | * 8/1996 |
| WO | 93/05436 | * 3/1993 |
| WO | 98/16865 | 4/1998 |

OTHER PUBLICATIONS

"Cholesteric Liquid Crystal/Polymer . . ." By D.–K. Yang et al, Appl. Phys Lett, vol. 60, No. 25, Jun. 22, 1992, pp. 3102–3104

"Reverse mode microdroplet Liquid Crystal . . ." Y.–D. Ma et al, SPIE vol. 1257 Liquid Crystal Displays and Application 1990.

* cited by examiner

Primary Examiner—Shean C. Wu
(74) Attorney, Agent, or Firm—Mciahel J. Striker

(57) ABSTRACT

The transparent haze-free reverse mode electrooptical solid film is made by mixing a liquid crystal and up to 60% by weight of an organic monomer to form a liquid crystal-organic monomer mixture and subsequently polymerizing the organic monomer by ultraviolet light thermal activation to form the electrooptical solid film. If the organic monomer is not a liquid crsytal, the mixture is a microemulsion and must by subjected to an applied filed during polymerization to orient the liquid crystal component. If the organic monomer is also a liquid crystal, the mixture is a homogeneous solution and no applied field is necessary during polymerization. The reverse mode electrooptical solid film is highly adhesive to glass or plastic supports.

11 Claims, 1 Drawing Sheet

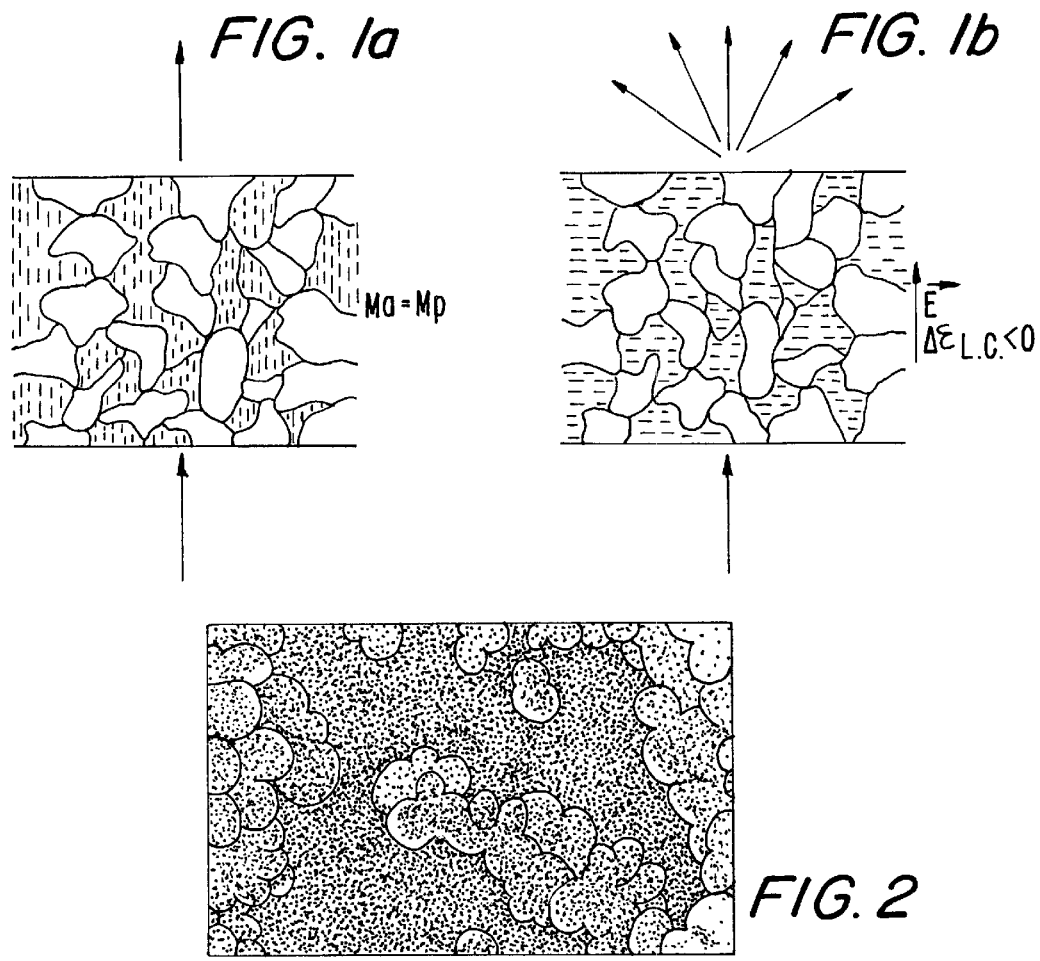
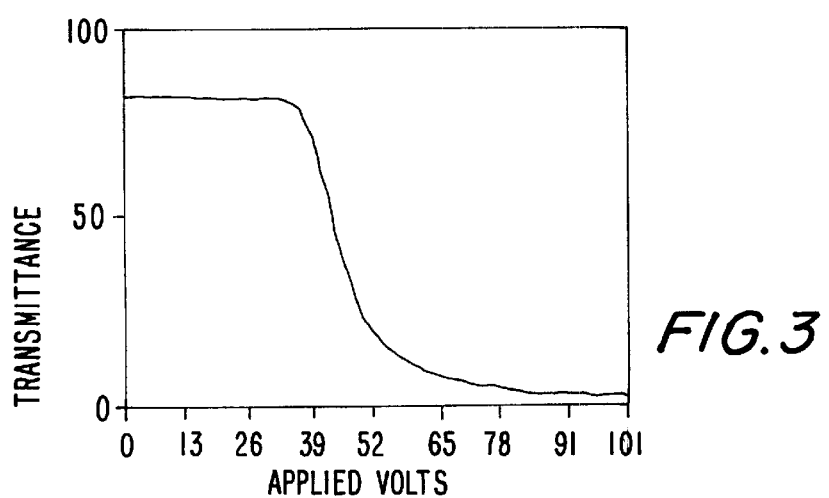

REVERSE MODE ELECTRO-OPTICAL FILM COMPOSED OF ONE MUTUAL DISPERSION OF POLYMERS AND LIQUID CRYSTALS

BACKGROUND OF THE INVENTION

1. Field of the Invention

A new type of composite material made by liquid crystals and polymers which is naturally transparent to light and becomes opaque by application of electric fields has been invented. In this material the two components (polymer and liquid crystal) are mutually dispersed one in the other. With respect to other similar inventions, concerning mutual dispersed liquid crystal and polymers, this new type of film presents the following advantages:

1. It is highly adhesive to glass or plastic supports since it contains more than 50% of the polymer component.
2. It can be produced starting from a binary emulsion of a thermotropic liquid crystal and a non liquid crystal organic compound, differently from other mutual dispersion of liquid crystals and polymers, which are produced by polymerising liquid crystals solution.
3. It has a haze-free electrooptical transmission.

2. Prior Art

In the last fifteen years many composite electrooptical films made by liquid crystals and polymers have been produced. Some of these film are made by droplets of liquid crystal dispersed in polymers and are usually defined as polymer dispersed liquid crystals (PDLC).

Direct Mode PDLC, are those films being opaque in their natural state, and becoming transparent under the application of electric fields (1,2). In order to extend the application field of PDLC films, Reverse mode PDLC have been also invented (3,4).

Another class of composite films, are those containing small percentages (typically 3%–10%) of polymers dispersed in liquid crystal layers (5–10). These films, usually defined as GELS, have the advantage to be transparent in their natural state and furthermore they are almost haze-free, but they have a poor adhesive character.

Recently a new class of liquid crystals and polymer composite films have been produced where comparable amounts of polymer and liquid crystals are mutually dispersed one in the other (11). No droplets of liquid crystals dispersed in polymer, or droplets of polymer in the liquid crystals are present. Despite of their complex morphology these films are almost haze free in their transparent state.

The material above mentioned do not consent to optimise the full set of properties required for their application in display technology, smart windows production etc, where they must be inserted as tin films between glass or plastic supports, in order to confer a variable light transmission character to the system.

Important requirements are:

1. Reverse mode character. The film has to be naturally transparent and must become opaque under the action of an electric field.
2. The optical contrast must be high.
3. In the clear state the optical transmission has to be almost constant as a function of the viewing angle (the angle between the perpendicular to the film and the viewing direction). Such a property of the films is usually defined as "haze free" character.
4. The films must have a very good adhesion to the surface of glass or plastic supports. This property is required in order to simplify the construction of optical devices and in order to confer to these devices a strong mechanical stability.

Electrooptical films made by polymers and liquid crystals invented since now cannot be optimized with respect to all the above requirements.

Reverse Mode PDLC films (those containing molecular oriented droplets of liquid crystals dispersed in a continues polymer matrix) can be easily optimised with respect to above 1,2,4 properties, but it is very difficult, due to the morphology of the system, to provide them with a haze-free character.

Films of liquid crystals containing small percentages of polymers can be easily optimised with respect to 1,2,3 properties, but they will have a poor adhesion character, since this property is directly correlated to the polymer abundance.

Films of mutually dispersed polymer and liquid crystals, having a high polymer concentration, have been produced until now only in the direct scattering mode configuration, in such a way that they are optimized only with respect to 2,3,4 properties (11).

SUMMARY OF THE INVENTION

It is therefore an object of present invention to provide a film made by a mutual dispersion of polymer and liquid crystal where the liquid crystal domains remains in an oriented state in absence of directly applied electric field, thus having a so-called reverse mode electrooptical behavior.

It is another object of the present invention to provide a film made by a mutual dispersion of polymer and liquid crystals having a haze-free electrooptical character, due to the morphology of the system.

It is another object of the present invention to provide a film made by a mutual dispersion of polymer and liquid crystals having a high electrooptical contrast.

It is still another object of the present invention to provide a film made by a mutual dispersion of polymer and liquid crystal having a high polymer concentration, preferentially above 50% in weight, in order to have a high adhesion to glass or plastic substrates.

It is a further object of the present invention to provide a film made by a mutual dispersion of polymer and liquid crystals having all the above mentioned properties and where the polymer component is obtained both a) by polymerizing in situ an organic monomer not belonging to liquid crystalline phases, b) by polymerizing in situ an organic monomer belonging to the liquid crystal class.

It is a further object of the present invention to provide new processes to prepare the above films.

It is a final object of the present invention to provide an electrooptical cell where the film above mentioned it is sandwiched between two supporting conductive glass or plastic supports and where a d.c. or a.c. electric power supply it is used in order to provide an electric field to switch the film from a transparent to an opaque state.

In order to achieve these objects two processes which are also object of the present invention have been developed.

First Process

1. A liquid crystal and an organic monomer having the property to form a fluid emulsion, where droplets of liquid crystals are dispersed into the organic monomer, are selected.
2. The two components plus some minor component such as polymerisation activators or dyes if required are mixed together to form the emulsion.
3. The emulsion is deposited above glass or plastic conductive supports.

4. A magnetic field is applied to the system, in order to orient the liquid crystal contained into the droplets.
5. The polymerisation of the monomer is activated by u.v. light or thermally, depending on the chemical nature of the monomer.

The chemical properties of the monomer to be used must be such that:
they must form an emulsion with the liquid crystal they must polymerize forming a mutual irregular dispersion of the liquid crystal and polymer.

It has been found by the authors of the present invention that a compound that satisfies to both these condition is the tripropyleneglycol diacrylate (TPGD) corresponding to the following chemical formula:

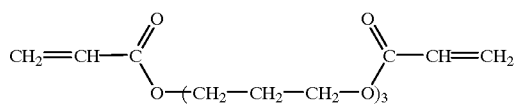

The polymerization of the monomer in the presence of the magnetic field will ensure a structure of the cured film similar to that described in FIG. 1a, where the liquid crystal molecules keep naturally a common orientation. If the refractive index of the polymer is matched with the no component of the liquid crystal refractive index the film will appear transparent, since no scattering of the light will be caused by the irregular distribution of the two components (the polymer and the Liquid Crystal).

In order to use the films to control the light transmission two other important conditions must be fulfilled:
The dielectric anisotropy of the liquid crystal must be negative and its retractive index anisotropy must be quite large. In this case, when an electric field is applied to the film, the liquid crystal molecules will be gradually tilted perpendicularly to their natural direction and the film will gradually become opaque due to the mismatching of the refractive indices of the polymer and liquid crystal along the viewing direction, as it is indicated in FIG. 1b.

Second Process
1. Two low weight liquid crystals which form a homogeneous solution are mixed. One of the liquid crystals is a monomer containing double bonds in such a way that it can be polymerised by U.V. light or by thermal activation.
2. The above solution, added by some minor component such as polymerisation activators, dyes or spacers, is deposited as a tin fluid film between glass or plastic substrates being coated by a suitable thickness ITO layer.
3. The polymerization of the liquid crystal monomer is accomplished by U.V. or by thermal activation.

It must be underlined that in the case of this second process no external fields or additional coatings, with respect to the conductive ITO coatings, are needed in order to ensure a stable orientation of the liquid crystal into the final solid film. The requirements for the liquid crystals remaining dispersed into the solid matrix are the same as those described above in the case of the first process.

EXAMPLE 1

In the following example the preparation, according to the first of the proposed processes, and operation of the film which are the object of the present invention is described.

Starting materials for film preparation were:
1. The liquid crystal ZLI4788-000 (ZLI) from MERCK
2. The thri-Propylen-glycol-Diacrylate (TPGD) from HALDRICH
3. Tie radical polymerization starter IRGACURE 651 from CIBA-GEIGY.

An emulsion containing 38.6 wt % ZLI4788-000, 51 wt % TPGD, 0.4 WT % IRGACURE was prepared and successively spread as a thin film on glass support which surface was coated by an Indium Tin Oxide (ITO) layer to ensure electric conductivity. A suitable amount of spacers was also added to the film in order to keep a 15 micron constant thickness across the film surface, when another glass support, analogous to the one mentioned above was used to cover the bottom surface of the film.

The cell prepared as described above was then placed in a 2 tesla magnetic field direct along the normal to the plane of the cell. The cell was than U.V. irradiated for one minute. The final structure of the cell was of the type shown in FIGS. 1a and 1b.

The above procedure fulfills the following objectives:
1. To transform the starting films from a fluid emulsion, containing liquid crystal droplets, to a solid film containing a mutual dispersion of the liquid crystal and the polymer where no droplets are present, as it is illustrated into the electron microscope reported in FIG. 2, where the liquid crystal component as been washed out, but the polymer morphology is clearly visible.
2. To keep the liquid crystal component dispersed in the solid film in an oriented configuration where the liquid crystal molecules are oriented in the direction of the magnetic field which was applied during the polymerization step.

The electrooptical response of the cell is shown in FIG. 3, where the optical transparency is reported as a function of the operational voltage.

EXAMPLE 2

In this example the preparation, according to the second of the proposed processes, and operation of the film being object of the present invention are described.

Starting materials for film preparation were:
1. The liquid crystal ZLI4788-000 (ZLI) from MERCK
2. The monomer (in the following indicated as monomer 2) having the following chemical formula:

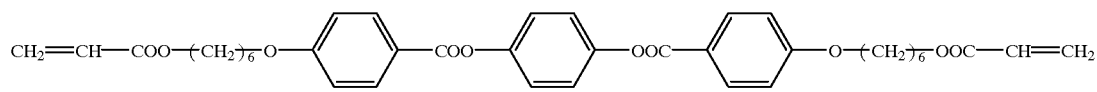

3. The radical polymerization starter IRGACURE 651 from CIBA-GEIGY.

A solution of 45 wt % ZLI, 54.6 wt % monomer 2 and 0.4 wt % of Irgacure 651 was prepared and successively spread as a thin film between glass supports being coated by a suitable thickness ITO layer, to ensure electric conductivity and a uniform orientation of the liquid crystal molecules perpendicularly to the supporting plane. The constancy of film thickness across the film layer was achieved by adding to the starting solution 15 micron thick spacers. The cell prepared as above described was then U.V. irradiated for one minute. The structure and morphology of the resulting solid films were found equal to that of the film obtained in example 1 (see FIGS. 1,2).

Even the electrooptical response was similar to that of the films obtained in example 1.

EXAMPLE 3

The only difference with respect to example 2 was that a different monomer (compound 2) has been used, that is to say the monomer (in the following indicated as monomer 3) having the chemical formula:

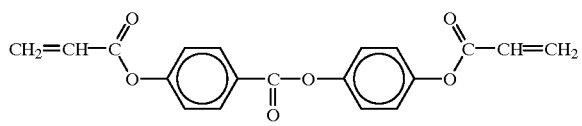

The structure of the film and its electrooptical response were similar to those shown in the previous examples.

BRIEF DESCRIPTION OF THE DRAWINGS

FIGS. 1a–1b illustrates the morphology of the film and its operating way in absence and in the presence of an operating electric field.

FIG. 2 is a photomicrograph, taken at the electron microscope showing the morphology of the film.

FIG. 3 shows the electrooptical response (transmitted light versus applied voltage) of the film.

REFERENCES

1. J. L. Ferguson, U.S. Pat. No. 4,435,047 (1984)
2. J. W. Doane, G. Chidichimo N. P. A. Vaz, U.S. Pat. No. 4,688,900 (1987)
3. Y. D. Ma, B. G. Wu, G. Xu, SPIE, 1257,46, (1990)
4. G. Chidichimo, G. DeFilpo, WO 9816865 (1996)
5. D. K. Yang, L. C. Chien, and J. W. Doane, Appl. Phys., Lett., 60(25), 3102 (1992)
6. N. Basturk, T. Chuard, Dechenaux, EP 0 703 287 A1 (1996)
7. R. A. M. Hikmet, EP 0 451 905 A1 (1991)
8. SEIKO-EPSON, EP 0 4888 116 A2 (1992)
9. K. Nakamura, H. Yoshida, K. Hanaoka, U.S. Pat. No. 5,189,540 (1993)
10. T. Gotoh, T. Nakata, H. Murai, E. Haregava, U.S. Pat. No. 5,674,576 (1997)
11. G. DeFilpo, G. Chidichimo, EP 0 799 879 A1 (1997)

What is claimed is:

1. A reverse mode electrooptical solid film made by a process comprising mixing a liquid crystal and from 50 to 60% by weight of an organic monomer together to form a liquid crystal-organic monomer mixture and subsequently polymerizing the organic monomer by ultraviolet light or thermal activation to form an irregular dispersion of the liquid crystal and the polymer, said irregular dispersion consisting of the electrooptical solid film;

whereby the electrooptical solid film is transparent to light and also haze-free due to the absence of liquid crystal droplets in the absence of an applied external field but becomes opaque in the presence of the applied external field.

2. The electrooptical solid film as defined in claim 1, wherein said organic monomer has the formula (I)

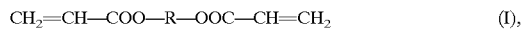

wherein R is a bivalent member selected from the group consisting of —[(CH$_2$)$_3$O]$_2$(CH$_2$)$_3$—; —(CH$_2$)$_6$—O—Ph—COO—Ph—OOC—Ph—O—[(CH$_2$)$_6$]—; and —Ph—COO—Ph—; and wherein —Ph— represents an unsubstituted p-phenylene group.

3. The electrooptical solid film as defined in claim 1, wherein the polymer is obtained by polymerizing a liquid crystal which is mixed with another liquid crystal, which does not polymerize, the obtained mixture being a homogeneous solution.

4. The electrooptical solid film as defined in claim 1, wherein the monomer consisting of a liquid crystal has double bonds so that no applied external fields are required to ensure stable orientation of the liquid crystal for the polymerization.

5. The electrooptical solid film as defined in claim 4, wherein said organic monomer has the formula (I)

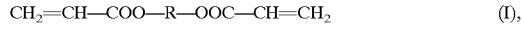

wherein R is —(CH$_2$)$_6$—O—Ph—COO—Ph—OOC—Ph—O—[(CH$_2$)$_6$]— or —Ph—COO—Ph—; and wherein —Ph— represents an unsubstituted p-phenylene group.

6. The electrooptical solid film as defined in claim 1, wherein the organic monomer is not a liquid crystal and the liquid crystal-organic monomer mixture is a micro-emulsion and wherein a magnetic field is applied to the micro-emulsion to orient the liquid crystal during the polymerization.

7. The electrooptical solid film as defined in claim 6, wherein the organic monomer is tripropyleneglycoldiacrylate.

8. A process for making a haze-free reverse mode electrooptical solid film, said process comprising the steps of:
   a) mixing two liquid crystals to form a homogeneous solution, one of said liquid crystals being an organic monomer polymerizable by ultraviolet light or thermal activation; said two liquid crystals being selected in amounts so that the liquid crystal-organic monomer mixture contains from 50 to 60 percent by weight of said organic monomer;
   b) depositing the homogeneous solution between glass or plastic substances coated by an indium tin oxide layer without surface treatment; and
   c) polymerizing said organic monomer by irradiating with said ultraviolet radiation or by said thermal activation to form the haze-free reverse mode electrooptical solid film.

9. The process as defined in claim 8, wherein said organic monomer has the formula (I)

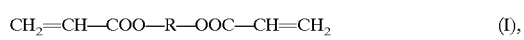

wherein R is —(CH$_2$)$_6$—O—Ph—COO—Ph—OOC—Ph—O—[(CH$_2$)$_6$]— or —Ph—COO—Ph—; and wherein —Ph— represents an unsubstituted p-phenylene group.

10. A process for making a haze-free reverse mode electrooptical solid film, said process comprising the steps of:

a) mixing a liquid crystal with an organic monomer to form a microemulsion, said organic monomer being polymerizable by ultraviolet light or thermal activation; said liquid crystal and said organic monomer being selected in amounts so that the liquid crystal-organic monomer mixture contains from 50 to 60 percent by weight of said organic monomer;

b) depositing the microemulsion above glass or plastic supports;

c) applying a magnetic field to the microemulsion; and d) during the applying of the magnetic field, polymerizing said organic monomer by irradiating with said ultraviolet radiation or by said thermal activation to orient the liquid crystal contained in the microemulsion and thus to form the haze-free reverse mode electrooptical solid film.

11. The process as defined in claim 10, wherein said organic monomer is tripropyleneglycoldiacrylate.

* * * * *